United States Patent
Dalsgaard et al.

(10) Patent No.: US 9,107,190 B2
(45) Date of Patent: Aug. 11, 2015

(54) DISCONTINUOUS RECEPTION FOR MULTI-COMPONENT CARRIER SYSTEM

(75) Inventors: Lars Dalsgaard, Oulu (FI); Jorma Kaikkonen, Oulu (FI); Jarkko Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 539 days.

(21) Appl. No.: 13/391,212
(22) PCT Filed: Aug. 17, 2010
(86) PCT No.: PCT/IB2010/053709
§ 371 (c)(1), (2), (4) Date: Mar. 19, 2012
(87) PCT Pub. No.: WO2011/021152
PCT Pub. Date: Feb. 24, 2011

(65) Prior Publication Data
US 2012/0178445 A1 Jul. 12, 2012

Related U.S. Application Data

(60) Provisional application No. 61/274,493, filed on Aug. 17, 2009.

(51) Int. Cl.
*H04W 48/16* (2009.01)
*H04W 36/30* (2009.01)
(Continued)

(52) U.S. Cl.
CPC .......... *H04W 72/02* (2013.01); *H04W 52/0216* (2013.01); *H04W 72/1289* (2013.01)

(58) Field of Classification Search
None
See application file for complete search history.

(56) References Cited

U.S. PATENT DOCUMENTS 8,254,330 B1 * 8/2012 Wurtenberger et al. ...... 370/331
8,477,738 B2 * 7/2013 Hole et al. .................... 370/336
(Continued)

FOREIGN PATENT DOCUMENTS

GB   2469800 A    11/2010
WO   2010/051209 A1   5/2010
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, V8.8.0, Mar. 2009, pp. 1-157.
(Continued)

*Primary Examiner* — Vladimir Magloire
*Assistant Examiner* — Frank Donado
(74) *Attorney, Agent, or Firm* — Harrington & Smith

(57) ABSTRACT

A method includes operating a user equipment to initiate monitoring of a control channel associated with a particular component carrier for determining if the user equipment is scheduled by the control channel associated with the particular component carrier. In response to determining that the user equipment is not scheduled, autonomously terminating the monitoring of the control channel associated with the particular component carrier. A further method includes establishing a set of rules defining how and when a user equipment autonomously deactivates use of component carriers transmitted by a network access node. The network access node assumes, in response to the network access node not scheduling the user equipment in a control channel of a particular component carrier for some period, that the user equipment has autonomously deactivated monitoring of the control channel of the particular component carrier. Various apparatus and computer programs are also disclosed that operate in accordance with the methods.

14 Claims, 5 Drawing Sheets

(51) Int. Cl.
*H04W 72/02* (2009.01)
*H04W 52/02* (2009.01)
*H04W 72/12* (2009.01)

(56) References Cited

U.S. PATENT DOCUMENTS

| | | | |
|---|---|---|---|
| 2004/0116110 A1 | 6/2004 | Amerga et al. | |
| 2006/0189334 A1* | 8/2006 | Wakabayashi | 455/500 |
| 2006/0193273 A1* | 8/2006 | Passier et al. | 370/310 |
| 2007/0091817 A1* | 4/2007 | Yoon et al. | 370/252 |
| 2008/0049669 A1* | 2/2008 | Lundby et al. | 370/329 |
| 2009/0196197 A1 | 8/2009 | DiGirolamo et al. | |
| 2012/0014306 A1* | 1/2012 | Pelletier et al. | 370/311 |
| 2012/0099439 A1* | 4/2012 | Baldemair et al. | 370/241 |

FOREIGN PATENT DOCUMENTS

| | | |
|---|---|---|
| WO | 2010/078365 A1 | 7/2010 |
| WO | 2010/114447 A1 | 10/2010 |

OTHER PUBLICATIONS

"3rd Generation Partnership Project; Technical Specification Group Radio Access Network; Requirements for further advancements for Evolved Universal Terrestrial Radio Access (E-UTRA) (LTE-Advanced) (Release 8)", 3GPP TR 36.913, V8.0.1, Mar. 2009, pp. 1-15.
"3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321, V8.6.0, Jun. 2009, pp. 1-47.
International Search Report and Written Opinion received for corresponding Patent Cooperation Treaty Application No. PCT/IB2010/053709, dated Nov. 30, 2010, 13 pages.
Bontu et al., "DRX Mechanism For Power Saving In LTE", IEEE Communications Magazine, vol. 47, Issue 6, Jun. 2009, pp. 48-55.
Ericsson, "DRX With Carrier Aggregation In LTE-Advanced", 3GPP TSG-RAN WG2 #66, R2-092959, Agenda Item: 7, San Francisco, USA, May 4-8, 2009, pp. 1-3.
Nokia, "L1 Control Signaling With Carrier Aggregation In LTE-Advanced", 3GPP TSG-RAN WG1 Meeting #54bis, R1-083730, Agenda Item: 11, Nokia Siemens Networks, Prague, Czech Republic, Sep. 29-Oct. 3, 2008, 7 pages.

* cited by examiner

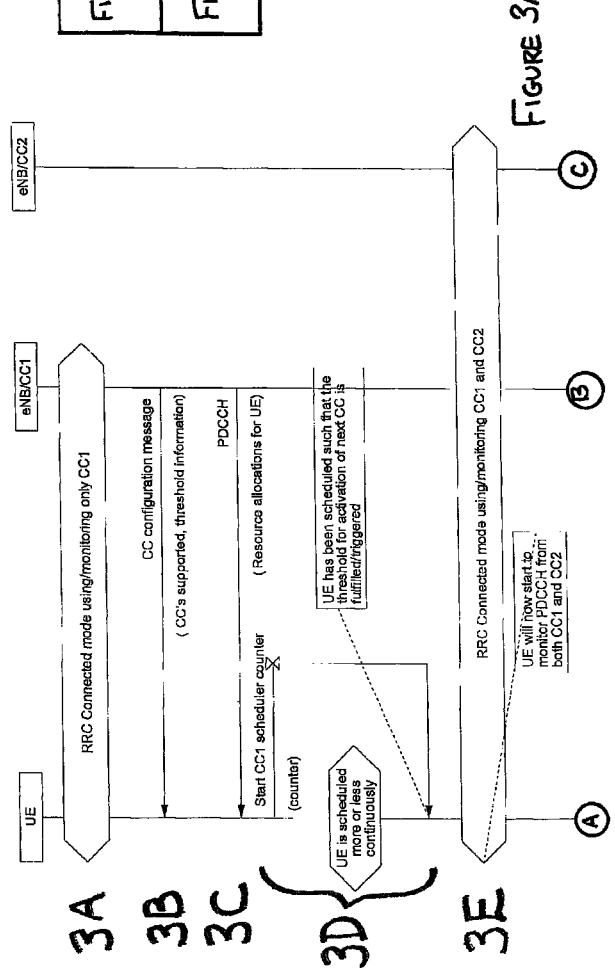

DISCONTINUOUS RECEPTION FOR MULTI-COMPONENT CARRIER SYSTEM

RELATED APPLICATION

This application was originally filed as PCT Application No. PCT/IB2010/053709 filed Aug. 17, 2010, which claims priority benefit from U.S. Priority Provisional Application No. 60/274493, filed Aug. 17, 2009.

TECHNICAL FIELD

The exemplary and non-limiting embodiments of this invention relate generally to wireless communication systems, methods, devices and computer programs and, more specifically, relate to discontinuous reception operation of a user equipment, such as a mobile phone, in a radio communication network.

BACKGROUND

This section is intended to provide a background or context to the invention that is recited in the claims The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
BW bandwidth
CC component carrier
DL downlink (eNB to UE)
DRX discontinuous reception
eNB evolved Node B
E-UTRA evolved universal terrestrial radio access
HSPA-DC high speed packet access dual carrier
LTE long term evolution
LTE-A LTE advanced
PDCCH physical downlink control channel
RAN radio access network
RRC radio resource control
Rel release
TS technical specification
UE user equipment
UL uplink (UE to eNB)

The specification of a communication system known as evolved UTRAN (EUTRAN, also referred to as UTRAN-LTE or as E-UTRA) is currently nearing completion within the 3GPP. One specification of interest is 3GPP TS 36.300, V8.8.0 (2009-04), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8), incorporated by reference herein in its entirety.

FIG. 1 reproduces FIG. 4.1 of 3GPP TS 36.300, and shows the overall architecture of the EUTRAN system (Rel-8). The EUTRAN system includes eNBs, providing the E-UTRA user plane and control plane (radio resource control) protocol terminations towards the UE. The eNBs are interconnected with each other by means of an X2 interface. The eNBs are also connected by means of an S1 interface to an evolved packet core (EPC), more specifically to a mobile management entity (MME) by means of a S1 MME interface and to a serving gateway (SGW) by means of a S1 interface. The S1 interface supports a many to many relationship between MMEs/Serving Gateways and eNBs.

The eNB hosts the following functions:
functions for Radio Resource Management: Radio Bearer Control, Radio Admission Control, Connection Mobility Control, Dynamic allocation of resources to UEs in both uplink and downlink (scheduling);
IP header compression and encryption of the user data stream;
selection of a MME at UE attachment;
routing of User Plane data towards Serving Gateway;
scheduling and transmission of paging messages (originated from the MME);
scheduling and transmission of broadcast information (originated from the MME or O&M (operation and maintenance)); and
measurement and measurement reporting configurations to provide mobility and scheduling.

Of particular interest herein are the further releases of 3GPP LTE (e.g., LTE Rel-10) targeted towards future IMT-A systems, referred to herein for convenience simply as LTE-Advanced (LTE-A). Reference in this regard may be made to 3GPP TR 36.913, V8.0.1 (2009-03), 3rd Generation Partnership Project; Technical Specification Group Radio Access Network; Requirements for Further Advancements for E-UTRA (LTE-Advanced) (Release 8), incorporated by reference herein in its entirety.

E-UTRAN introduced a DRX technique for the RRC-Connected mode such that, depending on the network configured DRX parameters, it is possible to achieve UE power saving while in the connected mode. It is expected that the future development of LTE-A and HSPA-DC will introduce yet another dimension to the DRX concept by adding a frequency dimension to the conventional time dimension.

SUMMARY

The foregoing and other problems are overcome, and other advantages are realized, by the use of the exemplary embodiments of this invention.

In a first aspect thereof the exemplary embodiments of this invention provide a method that comprises operating a user equipment to initiate monitoring of a control channel associated with a particular component carrier for determining if the user equipment is scheduled by the control channel associated with the particular component carrier and, in response to determining that the user equipment is not scheduled, autonomously terminating the monitoring of the control channel associated with the particular component carrier.

In a further aspect thereof the exemplary embodiments of this invention provide an apparatus that comprises a processor and a memory including computer program code. The memory and computer program code are configured to, with the processor, cause the apparatus at least to operate a user equipment to initiate monitoring of a control channel associated with a particular component carrier to determine if the user equipment is scheduled by the control channel associated with the particular component carrier and, in response to determining that the user equipment is not scheduled, autonomously terminate the monitoring of the control channel associated with the particular component carrier.

In a further aspect thereof the exemplary embodiments of this invention provide an apparatus that comprises means for receiving component carriers transmitted from a wireless network access node and means for monitoring a control channel associated with a particular received component carrier. The monitoring means is responsive to detecting that the apparatus has been scheduled by the monitored control channel by an amount that exceeds a threshold amount for autonomously initiating the monitoring of a control channel associated with another received component carrier for determining if the apparatus is scheduled by the control channel associated with the another received component carrier. The monitoring means is further responsive to determining that the apparatus is not scheduled, for autonomously terminating the monitoring of the control channel associated with the another received component carrier while continuing to monitor the control channel associated with the particular component carrier.

In another aspect thereof the exemplary embodiments of this invention provide a method that comprises establishing a set of rules defining how and when a user equipment autonomously deactivates use of component carriers transmitted by a network access node and the network access node assuming, in response to the network access node not scheduling the user equipment in a control channel of a particular component carrier for some period, that the user equipment has autonomously deactivated monitoring of the control channel of the particular component carrier.

In yet another aspect thereof the exemplary embodiments of this invention provide an apparatus that comprises a processor and a memory including computer program code. The memory and computer program code are configured to, with the processor, cause the apparatus at least to establish a set of rules defining how and when a user equipment autonomously deactivates use of component carriers transmitted by a network access node and assume, in response to the network access node not scheduling the user equipment in a control channel of a particular component carrier for some period, that the user equipment has autonomously deactivated monitoring of the control channel of the particular component carrier.

In a still further aspect thereof the exemplary embodiments of this invention provide an apparatus that comprises means for establishing a set of rules defining how and when a user equipment autonomously activates and deactivates use of component carriers transmitted by a network access node. The apparatus further comprises means for assuming, in response to the network access node scheduling the user equipment in a control channel of a first component carrier above some predetermined threshold scheduling amount, that the user equipment has autonomously activated a second component carrier and has begun to monitor the control channel of the second component carrier to detect a scheduling occasion for the second component carrier. And where the assuming means further assumes, in response to the network access node not scheduling the user equipment in the control channel of the second component carrier for some period, that the user equipment has autonomously deactivated use of the second component carrier and has terminated monitoring the control channel of the second component carrier, and that the user equipment continues to monitor the control channel of the first component carrier after the user equipment has autonomously activated the second component carrier.

DETAILED DESCRIPTION

The exemplary embodiments of this invention address and solve certain problems related to the use of DRX in advanced radio communication systems, such as LTE-A and HSPA-DC.

In future systems such as LTE-A and dual carrier HSPA there will exist a concept of the simultaneous presence more than one component carrier (CC) in a cell. Each CC will likely be operated independently in the sense that a UE may be assigned radio resources on more than one CC only when seen necessary by a resource scheduler of the eNB (base station).

This would imply that, in many cases, even when an eNB supports more than one CC the UE will only be scheduled using resources of one CC. When seen necessary by the eNB resource scheduler one or more CCs may be activated for the UE and included in the overall scheduling space for the UE. Similarly the eNB may as well, e.g., when the need for resources is lower, discontinue the scheduling of a UE on a given CC. That is, the eNB may deactivate a previously activated CC for a particular UE.

As may be appreciated, this type of active (dynamic) activation and/or deactivation of a given CC requires some control and common understanding between the eNB and the UE in order to function in an error free and efficient manner. To the knowledge of the inventors, prior to this invention such a control mechanism did not exist.

Figure 1:
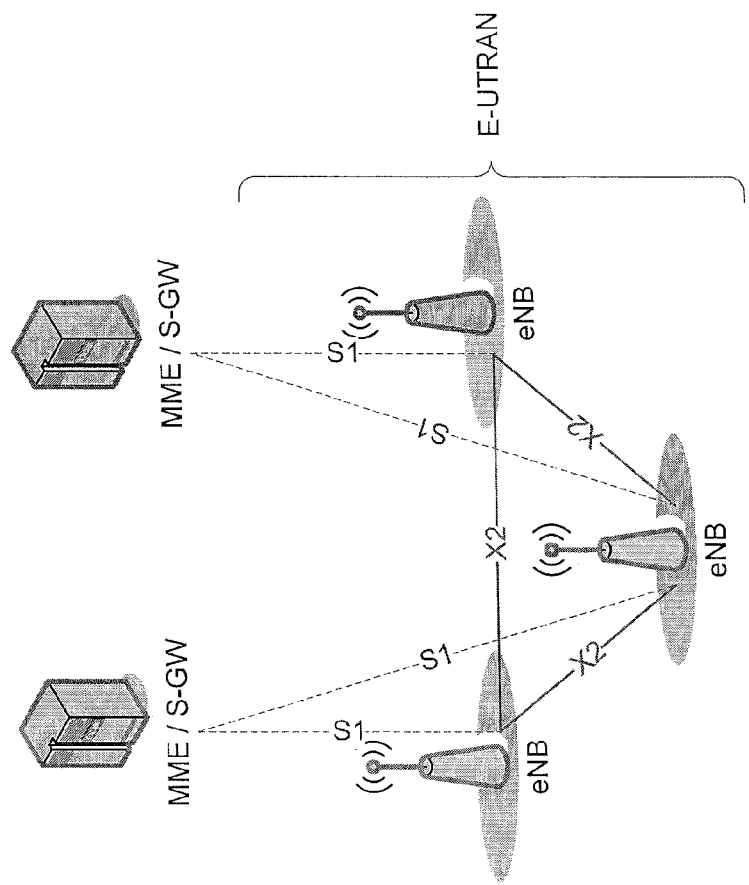
FIG. 1 reproduces FIG. 4.1 of 3GPP TS 36.300, and shows the overall architecture of the EUTRAN system.
Figure 2:
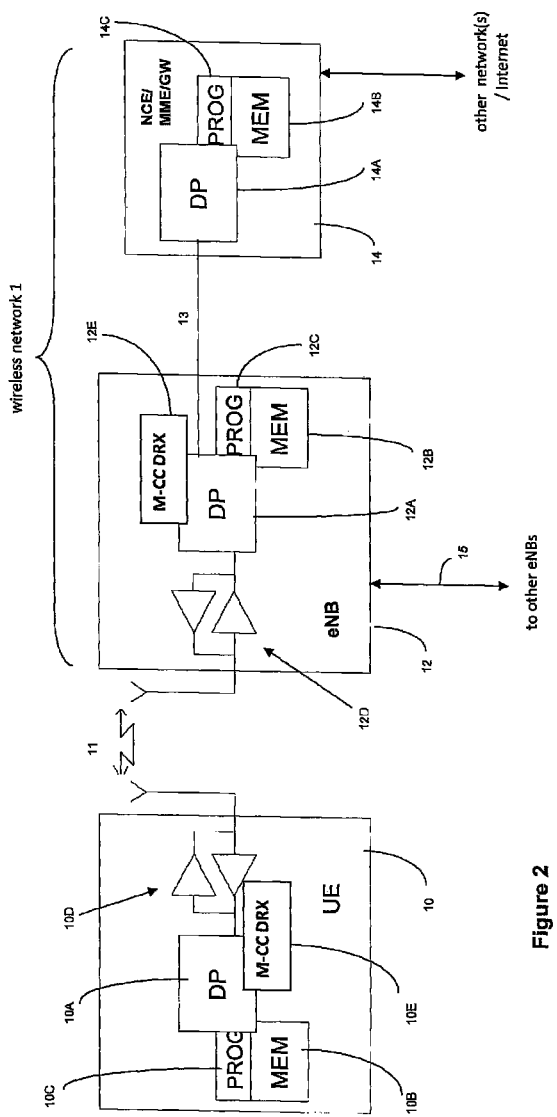
FIG. 2 shows a simplified block diagram of various electronic devices that are suitable for use in practicing the exemplary embodiments of this invention.

Before describing in detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a wireless network access node, such as a Node B (base station), and more specifically an eNB 12. The network 1 may include a network control element (NCE) 14 that may include the MME/SGW functionality shown in FIG. 1, and which provides connectivity with a further network, such as a telephone network and/or a data communications network (e.g., the internet). The UE 10 includes a controller, such as at least one computer or a data processor (DP) 10A, at least one computer-readable memory medium embodied as a memory (MEM) 10B that stores a program of computer instructions (PROG) 10C, and at least one suitable radio frequency (RF) transceiver (transmitter and receiver) 10D for bidirectional wireless communications with the eNB 12 via one or more antennas. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver (transmitter and receiver) 12D for communication with the UE 10 via one or more antennas. The eNB 12 is coupled via a data/control path 13 to the NCE 14. The path 13 may be implemented as the S1 interface shown in FIG. 1. The eNB 12 may also be coupled to another eNB via data/control path 15, which may be implemented as the X2 interface shown in FIG. 1.

For the purposes of describing the exemplary embodiments of this invention the UE 10 may be assumed to also include a multiple CC (M-CC) DRX unit (or more generally a CC activation/deactivation unit) 10E that receives and interprets DL control channel signaling related to multi-CC DRX operation, in accordance with the exemplary embodiments of this invention, and the eNB 12 also includes a resource scheduler and a M-CC DRX unit (or more generally a CC activation/deactivation unit) 12E that composes DL control channel signaling in accordance with the exemplary embodiments of this invention.

The UE 10 M-CC DRX unit 10E is assumed to include at least one counter or timer or similar mechanism, as described below, and logic for comparing the output of the counter or timer to a threshold value in order to autonomously make CC activation/deactivation decisions.

The eNB 12 M-CC DRX unit 12E in cooperation with the processor 12A, based on knowledge of a rules set and related parameters (at least some of which are signaled to the UE 10) is configured to make certain assumptions or predictions regarding the autonomous operation of the UE 10, such as when the UE 10 activates and/or deactivates monitoring of component carriers as will be described in detail below.

At least one of the PROGs 10C and 12C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware). For example, the M-CC DRX unit (CC activation/deactivation unit) 10E may be implemented solely as computer instructions executable by the DP 10A, or solely as logic circuits, or as a combination of computer instructions and logic circuits. Further by example, the M-CC DRX unit (CC activation/deactivation unit) 12E may be implemented solely as computer instructions executable by the DP 12A, or solely as logic circuits, or as a combination of computer instructions and logic circuits.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

In accordance with the exemplary embodiments of this invention the problems discussed above are addressed and solved by the implementation of a rules set for activation and/or deactivation of (additional) component carriers in order to achieve simple and efficient control of the CC (frequency or cell) dimension in a radio communication system that uses multiple CCs.

For this purpose a discontinuous component carrier reception (DCCR) principle is introduced which defines a set of rules as to how and when the UE 10 activates and/or deactivates the given CCs. The DCCR rules and/or parameters related thereto may be controlled by the network/eNB 12 and signaled to an individual UE 10 using dedicated signaling, such as RRC signaling, or the DCCR rules and/or parameters related thereto may be signaled to a plurality of UEs 10 by the use of broadcast or multicast signaling.

It should be noted that as described below the rules set can contain rules pertaining to both the activation and the deactivation of CCs. However, in some embodiments only the autonomous activation of CCs may be desirable, while in other embodiments only the autonomous deactivation of CCs may be desirable.

The basic behavior may be stated as follows: if the UE 10 activity (e.g., scheduling occasions) on one CC increases above a certain predetermined threshold (the threshold may be valued in, for example, time or scheduling density) the UE 10 autonomously 'activates' another CC (whether or not configured by the radio network) and begins monitoring the PDCCH on the newly activated CC. This monitoring of the PDCCH on the newly activated CC is in addition to monitoring the PDCCH on an already actively monitored CC or CCs.

Similarly, when the UE 10 has not been scheduled on a given CC for some period of time (e.g., some given number of PDCCH occasions), the UE 10 terminates monitoring the PDCCH on the given CC and autonomously 'deactivates' the given CC.

In order to make the DCCR more robust CC activation and deactivation may be supported or followed by signaling between the UE 10 and the eNB 12 in order to confirm the DCCR change. This may be accomplished in the source and/or target CC. In this case the 'source' CC may be considered as the CC originally being used and monitored by the UE 10, and the 'target' CC may be considered as the new CC that is autonomously activated by the UE 10. The signaling may be of any suitable type, including the use of a MAC CE (control element).

Figure 3B:
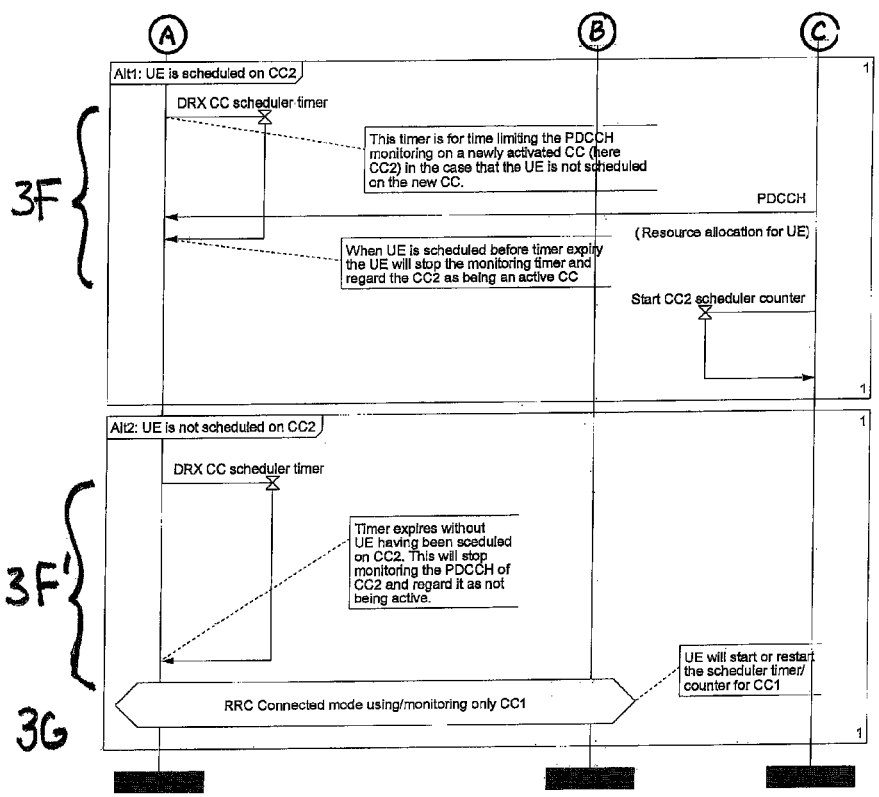
FIG. 3 shows the relative position of FIG. 3A to FIG. 3B, which in turn present an exemplary signal flow diagram that illustrates, in accordance with exemplary embodiments of this invention, an operation of the user equipment of FIG. 2 with the base station (eNB) shown in FIGS. 1 and 2.

Reference is now made to FIGS. 3A and 3B. Assume that the UE 10 is camped on some given CC in the RRC_Connected mode. At operation 3A the UE 10 monitors the PDCCH of the CC according to the given DRX, which for convenience (and not as a limitation) may be assumed to be similar to those defined for E-UTRAN Rel-8 (e.g., see 3GPP TS 36.321 V8.6.0 (2009-06) Technical Specification 3rd Generation Partnership Project; Technical Specification Group Radio Access Network; Evolved Universal Terrestrial Radio Access (E-UTRA) Medium Access Control (MAC) protocol specification (Release 8). DRX operation of the UE 10 in the RRC_Connected mode or state is described in sub-clause 5.7 (Discontinuous Reception (DRX)).

For convenience, sub-clause 5.7 is reproduced as follows:
The UE may be configured by RRC with a DRX functionality that controls the UE's PDCCH monitoring activity for the UE's C-RNTI, TPC-PUCCH-RNTI, TPC-PUSCH-RNTI and Semi-Persistent Scheduling C-RNTI (if configured). When in RRC_CONNECTED, if DRX is configured, the UE is allowed to monitor the PDCCH discontinuously using the DRX operation specified in this subclause; otherwise the UE monitors the PDCCH continuously. When using DRX operation, the UE shall also monitor PDCCH according to requirements found in other subclauses of this specification. RRC controls DRX operation by configuring the timers onDurationTimer, drx-InactivityTimer, drx-RetransmissionTimer (one per DL HARQ process except for the broadcast process), the longDRX-Cycle, the value of the drxStartOffset and optionally the drxShortCycleTimer and shortDRX-Cycle. A HARQ RTT timer per DL HARQ process (except for the broadcast process) is also defined (see subclause 7.7).

When a DRX cycle is configured, the Active Time includes the time while:
- onDurationTimer or drx-InactivityTimer or drx-Retransmission Timer or mac-ContentionResolutionTimer (as described in subclause 5.1.5) is running; or
- a Scheduling Request sent on PUCCH is pending (as described in subclause 5.4.4); or
- an uplink grant for a pending HARQ retransmission can occur and there is data in the corresponding HARQ buffer; or
- a PDCCH indicating a new transmission addressed to the C-RNTI of the UE has not been received after successful reception of a Random Access Response for the preamble not selected by the UE (as described in subclause 5.1.4).

When DRX is configured, the UE shall for each subframe:
If the Short DRX Cycle is used and [(SFN*10)+subframe number] modulo (shortDRX-Cycle)=(drxStartOffset) modulo (shortDRX-Cycle); or
if the Long DRX Cycle is used and [(SFN*10)+subframe number] modulo (longDRX-Cycle)=drxStartOffset:
start onDurationTimer.
if a HARQ RTT Timer expires in this subframe and the data in the soft buffer of the corresponding HARQ process was not successfully decoded:
start the drx-RetransmissionTimer for the corresponding HARQ process.
if a DRX Command MAC control element is received:
stop onDurationTimer;
stop drx-InactivityTimer.
if drx-InactivityTimer expires or a DRX Command MAC control element is received in this subframe:
if the Short DRX cycle is configured:
start or restart drxShortCycleTimer;
use the Short DRX Cycle.
else:
use the Long DRX cycle.
if drxShortCycleTimer expires in this subframe:
use the Long DRX cycle.
during the Active Time, for a PDCCH-subframe, if the subframe is not required for uplink transmission for half-duplex FDD UE operation and if the subframe is not part of a configured measurement gap:
monitor the PDCCH;
if the PDCCH indicates a DL transmission or if a DL assignment has been configured for this subframe:
start the HARQ RTT Timer for the corresponding HARQ process;
stop the drx-RetransmissionTimer for the corresponding HARQ process.
if the PDCCH indicates a new transmission (DL or UL):
start or restart drx-InactivityTimer.
when not in Active Time, CQI/PMI/RI on PUCCH and SRS shall not be reported.

Regardless of whether the UE is monitoring PDCCH or not the UE receives and transmits HARQ feedback when such is expected.

NOTE: A UE may optionally choose to not send CQI/PMI/RI reports on PUCCH and/or SRS transmissions for up to 4 subframes following a PDCCH indicating a new transmission (UL or DL) received in the last subframe of active time. The choice not to send CQI/PMI/RI reports on PUCCH and/or SRS transmissions is not applicable for subframes where onDurationTimer is running.

Returning now to the description of FIGS. 3A and 3B, at operation 3B, and in addition to the parameters defined in 3GPP TS 36.321, the UE 10 receives information of which CCs are used by the eNB 12, and additionally the necessary information for controlling the activation and/or deactivation of the CCs. This signaling may be referred to as a CC configuration message. That is, the UE 10 may be informed of which timer or counter values to use for different scheduler counters and scheduler timers controlling the activation and/or deactivation of a CC. The same counter or timer could be used for autonomous CC activation and deactivation, or a separate counter or timer could be used for each of these functions. Each CC may have its own associated timer(s) or counter(s). Each CC may be specified to have different or the same timer or counter values. The timer or counter values may be considered to be, or to form a part of, threshold information for controlling the autonomous activation/deactivation of one or more CCs.

When the UE 10 is scheduled by the eNB 12 (at operation 3C) the UE 10 initiates at operation 3D a CC1 scheduler counter which counts, for example, the number of occasions where the UE 10 is scheduled for CC1. If the UE 10 is scheduled often, and if the scheduler timer value exceeds the threshold value (which may have been configured by the eNB 12 at 3B), the UE 10 autonomously activates monitoring of the next CC, in this example CC2, at operation 3E. Note that at operation 3E the UE 10 is monitoring the PDCCH associated with CC1, as well as the PDCCH associated with CC2. It should be noted, however, that the continued monitoring of CC1 may not be always the case. For example, it might be the case that the monitoring of CC1 is terminated or discontinued (e.g., CC1 may be de-activated in accordance with the operation of the exemplary embodiments of this invention).

The trigger event for activating monitoring of the PDCCH on CC2 may be, as one non-limiting example, that the UE 10 is scheduled with a density or frequency higher than the given threshold (e.g., the UE 10 is assigned resources in every second PDCCH in CC1), or it may be based on some other measurement. In general, the trigger event may be based on one or more conditions of interest being realized.

When the UE 10 has activated PDCCH monitoring of CC2 it initiates at operation 3F a guard timer, which may be referred to as a DRX CC scheduler timer or counter, or more generally as a DRX CC usage indicator or simply CC deactivation timer. For example, a condition that may be satisfied by the operation of the DRX CC usage indicator may be given by a number of PDCCHs possibly according to DRX (and thus potentially not continuous in time). That is, the DRX CC usage indicator may count PDCCHs monitored by the UE 10, e.g., according to DRX rules, or continuously (depending on the agreed rules). When the DRX CC usage indicator reaches a maximum value (or if decremented to zero from some initial non-zero value) the UE 10 terminates monitoring of the newly activated CC. A purpose of the DRX CC usage indicator is to ensure that the UE 10 does not unnecessarily continue to monitor the newly activated CC2, and may deactivate the monitoring in the event the UE 10 is not actively scheduled on the CC2. This autonomous deactivation of CC monitoring serves to conserve UE 10 power by avoiding an unnecessary monitoring of the PDCCH of CC2.

If in the example of 3F the UE 10 is scheduled on CC2 within the DRX CC scheduler timer time period (i.e., before the DRX CC scheduler timer expires) the UE 10 regards the CC2 as active or activated and continues to monitor the CC according to given DRX rules. If the UE is not actively scheduled on CC2 within the DRX CC scheduler timer period, shown as operation 3F', the UE 10 deactivates CC2 and terminates monitoring the PDCCH of CC2. In this case, at operation 3G, the UE 10 reverts to operation in the RRC_Connected mode using/monitoring only the PDCCH of CC1.

It should be noted that the timer can be reset, for example, when the UE 10 is scheduled or receives an explicit signal (e.g., a MAC CE as described above). For example, each UE scheduling event can be used to reset the timer and, so long as the UE 10 receives a next scheduling event for the CC within a period defined by the timer time-out period, the timer will not reach its maximum value and cause a time out to occur.

It should also be noted that activation of the timer is not dependent on the event that caused the associated CC to be activated. For example, operation of the timer can be initiated if the CC is activated in response to explicit signaling received from the eNB 12 or is activated autonomously by the UE 10.

As should be appreciated, while the exemplary embodiments of this invention have been described thus far as using two CCs, the operations described may be extended to any number of CCs.

There are a number of advantages and technical effects that can be realized by the use of these exemplary embodiments of this invention. For example, the use of these exemplary embodiments provides for a flexible and signaling-free activation and/or deactivation of a CC, thereby reducing signaling overhead between the eNB 12 and the UE 10. Further by example, the use of these exemplary embodiments enables network control through configurable parameter settings that are signaled from the eNB 12 to the UE 10 (e.g., as part of the CC configuration message). In addition, the use of these exemplary embodiments avoids undesirable delays that may arise from the use of, for example, RRC signaling, as well as enabling the automatic deactivation of an unused CC (a CC wherein the UE 10 is not scheduled).

Note that the eNB 12 may have knowledge of what the CC1 counter/timer values of the UE 10 are, since it is scheduling the UE 10 via the PDCCH of CC1. So, the eNB 12 may assume that the UE 10 will initiate monitoring the PDCCH of CC2 at some point. The identity of CC2 may be assumed to be known by the eNB 12 so that it can schedule the UE in the correct CC that the UE is monitoring. For example, a list (e.g., an ordered list) of one or more additional suitable CCs may be part of the CC configuration message received at 3B in FIG. 3. The CC configuration message may include (as non-limiting examples) the CCs which the UE 10 could use, and also the order in which they are to be activated. Also the timers/counters related to each CC may be given in the CC configuration message.

It should be noted that in some situations an activation of a third CC (CC3) may depend on the activity on CC2, or on CC1.

Based on the foregoing it should be apparent that the exemplary embodiments of this invention provide a method, apparatus and computer program(s) to enhance multiple CC operation of the UE 10, in particular to enhance DRX or multi-CC monitoring operation when the UE 10 is in the RRC_Connected state.

Figure 4:
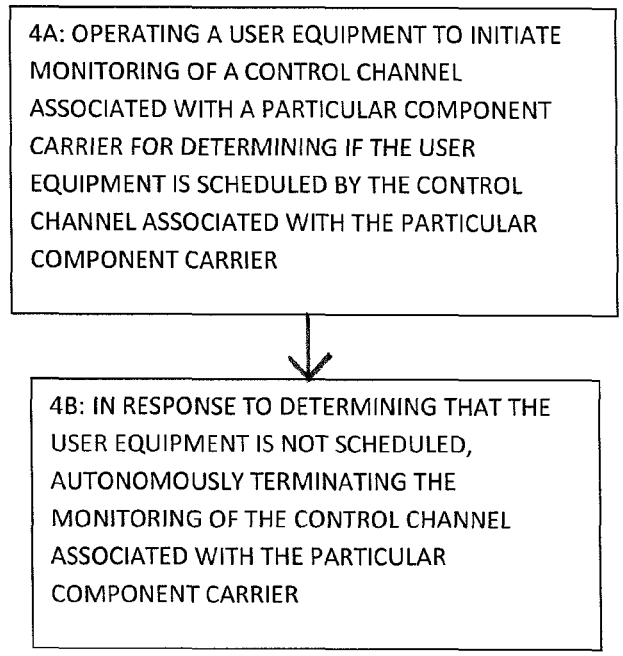
FIGS. 4 and 5 are each a logic flow diagram that illustrates the operation of methods, and results of execution of computer program instructions embodied on computer readable medium, in accordance with the exemplary embodiments of this invention.

FIG. 4 is a logic flow diagram that illustrates the operation of a method, and a result of execution of computer program instructions, in accordance with the exemplary embodiments of this invention. In accordance with these exemplary embodiments a method performs, at Block 4A, a step of operating a user equipment to initiate monitoring of a control channel associated with a particular component carrier for determining if the user equipment is scheduled by the control channel associated with the particular component carrier. At Block 4B there is a step, performed in response to determining that the user equipment is not scheduled, of autonomously terminating the monitoring of the control channel associated with the particular component carrier.

The method as in FIG. 4, where in response to the user equipment detecting that the user equipment has been scheduled by the control channel of the particular component carrier by an amount that exceeds a threshold amount, the method further comprises autonomously initiating the monitoring of a control channel associated with another component carrier.

The method of the preceding paragraph, where in response to determining that the user equipment is scheduled by the control channel associated with the another component carrier, further comprising a step of continuing to monitor the control channel associated with the another component carrier while also continuing to monitor the control channel associated with the particular component carrier and, in response to the user equipment detecting that the user equipment has been scheduled by the control channel associated with the another component carrier by an amount that exceeds the same or different threshold amount, autonomously initiating the monitoring of a control channel associated with a further component carrier.

The method of the preceding paragraphs, where initiating monitoring of the particular component carrier comprises starting a timer, and where autonomously terminating the monitoring of the control channel associated with the particular component carrier is performed in response to the timer expiring without the user equipment being scheduled by the monitored control channel during the period in which the timer is running to use the particular component carrier.

The method of the preceding paragraphs, where at least some of the steps of autonomously initiating the monitoring and autonomously terminating the monitoring include signaling a base station that transmits the component carriers.

The method of the preceding paragraph, where at least one or more of the threshold value and timer value are received in signaling from the base station.

The method of the preceding paragraphs, executed while the user equipment is in a RRC_Connected mode.

The exemplary embodiments of this invention also pertain to an apparatus comprising a processor and a memory that includes computer program code. The memory and the computer program code are configured, with the processor, to cause the apparatus to operate a user equipment to initiate monitoring of a control channel associated with a particular component carrier to determine if the user equipment is scheduled by the control channel associated with the particular component carrier and, in response to determining that the user equipment is not scheduled, to autonomously terminate the monitoring of the control channel associated with the particular component carrier.

The apparatus as in the preceding paragraph, where the memory and computer program code are further configured, with the processor, to cause the apparatus to respond to the user equipment detecting that the user equipment has been scheduled by the control channel of the particular component carrier by an amount that exceeds a threshold amount, to autonomously initiate the monitoring of a control channel associated with another component carrier.

The apparatus as in the preceding paragraph, where the memory and computer program code are further configured, with the processor, to cause the apparatus to respond to determining that the user equipment is scheduled by the control channel associated with the another component carrier, further comprising continuing to monitor the control channel associated with the another component carrier while also continuing to monitor the control channel associated with the particular component carrier and, in response to the user equipment detecting that the user equipment has been scheduled by the control channel associated with the another component carrier by an amount that exceeds the same or different threshold amount, autonomously initiating the monitoring of a control channel associated with a further component carrier.

The apparatus of the preceding paragraph, where the memory and the computer program code are further configured, with the processor, to receive at least one or more of the threshold value and timer value in signaling from a base station.

The apparatus of the preceding paragraphs, where the memory and the computer program code are further configured, with the processor, to execute monitoring, autonomously activating component carrier(s) and autonomously deactivating component carrier(s) while the user equipment is in a RRC_Connected mode.

The exemplary embodiments of this invention also pertain at least in part to an apparatus that comprises means for receiving component carriers transmitted from a wireless network access node and means for monitoring a control channel associated with a particular received component carrier. Responsive to detecting that the apparatus has been scheduled by the monitored control channel by an amount that exceeds a threshold amount, the monitoring means is further configured for autonomously initiating the monitoring of a control channel associated with another received component carrier for determining if the apparatus is scheduled by the control channel associated with the another received component carrier, and responsive to determining that the apparatus is not scheduled, for autonomously terminating the monitoring of the control channel associated with the another received component carrier while continuing to monitor the control channel associated with the particular component carrier.

Figure 5:
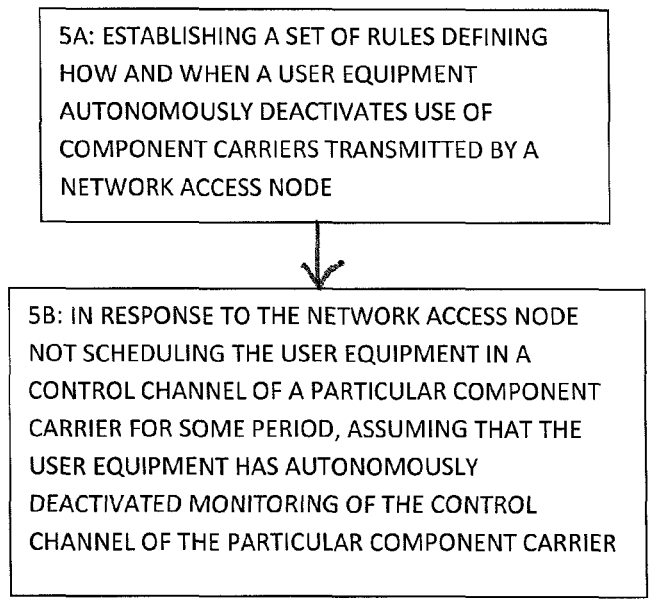

FIG. 5 is a logic flow diagram that illustrates the operation of a method, and a result of execution of computer program instructions, further in accordance with the exemplary embodiments of this invention. In accordance with these exemplary embodiments a method performs, at Block 5A, a step of establishing a set of rules defining how and when a user equipment autonomously deactivates use of component carriers transmitted by a network access node. At Block 5B there is a step of the network access node assuming, in response to the network access node not scheduling the user equipment in a control channel of a particular component carrier for some period, that the user equipment has autonomously deactivated monitoring of the control channel of the particular component carrier.

The method as in the preceding paragraph, where the set of rules also define how and when the user equipment autonomously activates use of component carriers transmitted by the network access node, and where the network access node further assumes, in response to the network access node scheduling the user equipment in the control channel of the particular component carrier above some predetermined threshold scheduling amount that the user equipment has autonomously activated use of another component carrier and has begun to monitor the control channel of the another component carrier to detect a scheduling occasion for the another component carrier.

The method of the preceding paragraph, where the network access node further assumes that the user equipment continues to monitor the control channel of the particular component carrier after the user equipment has autonomously activated the another component carrier.

The method of FIG. 5 and the preceding paragraphs, and further comprising using signaling between the network access node and the user equipment on at least one of the first and second component carriers to confirm the autonomous activation or deactivation of a component carrier.

The method of FIG. 5 and the preceding paragraphs, and further comprising signaling the set of rules and related parameters from the network access node to the user equipment using one of dedicated signaling or broadcast/multicast signaling.

The method of FIG. 5 and the preceding paragraphs, and further comprising signaling an ordered list of component carriers from the network access node to the user equipment whereby the network access node has knowledge of which component carrier has been autonomously activated by the user equipment.

The method of FIG. 5 and the preceding paragraphs, and further comprising signaling at least one value from the network access node to the user equipment, where the at least one value defines the period and whereby the network access node has knowledge of when the particular component carrier has been autonomously deactivated by the user equipment.

The method of FIG. 5 and the preceding paragraphs, executed while in a radio resource control connected mode and operating in a discontinuous reception mode.

Also disclosed is an apparatus that comprises a processor and a memory including computer program code. The memory and computer program code are configured to, with the processor, cause the apparatus at least to establish a set of rules defining how and when a user equipment autonomously deactivates use of component carriers transmitted by a network access node and to assume, in response to the network access node not scheduling the user equipment in a control channel of a particular component carrier for some period, that the user equipment has autonomously deactivated monitoring of the control channel of the particular component carrier.

Also disclosed is a non-transitory computer-readable medium that contains software program instructions, where execution of the software program instructions by at least one data processor of the user equipment and the network access node results in performance of operations that comprise execution of the method shown and described with reference to FIG. 4 and FIG. 5, respectively.

Also disclosed is an apparatus that comprises means for establishing a set of rules defining how and when a user equipment autonomously activates and deactivates use of component carriers transmitted by a network access node. The apparatus further comprises means for assuming, in response to the network access node scheduling the user equipment in a control channel of a first component carrier above some predetermined threshold scheduling amount, that the user equipment has autonomously activated a second component carrier and has begun to monitor the control channel of the second component carrier to detect a scheduling occasion for the second component carrier. The assuming means further assumes, in response to the network access node not scheduling the user equipment in the control channel of the second component carrier for some period, that the user equipment has autonomously deactivated use of the second component carrier and has terminated monitoring the control channel of the second component carrier, and that the user equipment continues to monitor the control channel of the first component carrier after the user equipment has autonomously activated the second component carrier.

In the foregoing the assuming means can comprise at least the data processor 12A and the program software stored in the memory 12B.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UTRAN-LTE (Rel-8) and LTE-A systems, it should be appreciated that the exemplary embodiments of this invention are not limited for use with only these particular types of wireless communication system and/or releases thereof, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names assigned to different channels (e.g., PDCCH) and any elements thereof are not intended to be limiting in any respect, as these various channels and elements may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    operating a user equipment (UE) to initiate monitoring of a control channel associated with a particular component carrier for determining if the user equipment is scheduled by the control channel associated with the particular component carrier for discontinuous reception; and
    in response to determining that the user equipment is not scheduled, terminating the monitoring of the control channel associated with the particular component carrier; where in response to on occurrence of a trigger event being detected by the user equipment, where the trigger event comprises the user equipment detecting that the user equipment has been scheduled by the control channel of the particular component carrier by an amount that exceeds a threshold amount for the discontinuous reception, the UE activates the monitoring of a physical downlink control channel (PDCCH) associated with another component carrier for the discontinuous reception;
    confirming that the user equipment has activated the monitoring of the PDCCH associated with the another component carrier with signaling between the user equipment and a base station that transmits the another component carrier;
    initiating, by the UE in response to the UE activating the monitoring of the PDCCH associated with the another component carrier for discontinuous reception, a counter;
    terminating, by the UE, the monitoring of the PDCCH associated with the another component carrier for the discontinuous reception when a number of PDCCH's monitored reaches a maximum value or is decremented to zero from an arbitrary initial value according to the counter; and
    confirming that the user equipment has terminated the monitoring of the newly activated control channel associated with the another component carrier with signaling between the user equipment and the base station that transmits the another component carrier.

2. The method of claim 1, where the threshold amount is received in signaling from the base station.

3. The method of claim 1, where initiating monitoring of the particular component carrier comprises starting a timer, and where terminating the monitoring of the control channel associated with the particular component carrier is performed in response to the timer expiring without the user equipment being scheduled by the monitored control channel during the period in which the timer is running to use the particular component carrier.

4. The method of claim 3, where the timer is initiated with a timer value that is received in signaling from a base station that transmits the component carriers.

5. The method as in claim 1, executed while the user equipment is in a radio resource control connected mode.

6. A non-transitory computer-readable medium that contains software program instructions, where execution of the software program instructions by at least one data processor of the user equipment results in performance of operations that comprise execution of the method as in claim 1.

7. An apparatus, comprising:
a processor; and
a memory including computer program code, where the memory and computer program code are
configured to, with the processor, cause the apparatus at least to,
operate a user equipment to initiate monitoring of a control channel associated with a particular
component carrier to determine if the user equipment is scheduled by the control channel
associated with the particular component carrier for discontinuous reception; and
in response to determining that the user equipment is not scheduled, terminate the monitoring of
the control channel associated with the particular component carrier;
the memory and computer program code being further configured to, with the processor, cause
the apparatus to, in response to determining that the user equipment is not scheduled, terminate the monitoring of the control channel associated with the particular component carrier, where in response to on occurrence of a trigger event being detected by the user equipment,
where the trigger event comprises the user equipment detecting that the user
equipment has been scheduled by the control channel of the particular component carrier by an
amount that exceeds a threshold amount for the discontinuous reception, to activate the monitoring of a physical downlink control channel (PDCCH) associated with another component carrier for the discontinuous reception;
confirm that the user equipment has initiated activated the monitoring of the PDCCH associated with
the another component carrier with signaling between the user equipment and a base station that
transmits the another component carrier;
initiating, by the UE in response to the UE activating the monitoring of the PDCCH associated with the another component carrier for discontinuous reception, a counter;
terminating, by the UE, the monitoring of the PDCCH associated with the another component carrier for the discontinuous reception when a number of PDCCH's monitored reaches a maximum value or is decremented to zero from an arbitrary initial value according to the counter; and
confirming that the user equipment has terminated the monitoring of the newly activated control channel associated with the another component carrier with signaling between the user equipment and the base station that transmits the another component carrier.

8. The apparatus of claim 7, where the threshold amount is received in signaling from the base station.

9. The apparatus of claim 7, where the memory and computer program code are further configured, with the processor, to cause the apparatus when initiating monitoring of the particular component carrier to start a timer, and to terminate the monitoring of the control channel associated with the particular component carrier in response to the timer expiring without the user equipment being scheduled by the monitored control channel during the period in which the timer is running to use the particular component carrier.

10. The apparatus of claim 9, where the timer is initiated with a timer value that is received in signaling from a base station that transmits the component carriers.

11. The apparatus as in claim 7, where the user equipment is in a radio resource control connected mode.

12. A method comprising:
establishing a set of rules defining how and when a user equipment deactivates use of component carriers transmitted by a network access node; and
the network access node assuming, in response to the network access node not scheduling the user equipment in a control channel of a particular component carrier for discontinuous reception for some period, that the user equipment has deactivated monitoring of the control channel of the particular component carrier;
where the set of rules also define how and when the user equipment activates use of component carriers transmitted by the network access node, and where the network access node further assumes, in response to the network access node scheduling the user equipment in the control channel of the particular component carrier above some predetermined threshold scheduling amount for the discontinuous reception that the user equipment has activated use of another component carrier for the discontinuous reception and has begun to monitor a physical downlink control channel (PDCCH) of the another component carrier to detect a scheduling occasion for the another component carrier;
where the network access node confirms that the user equipment has activated the monitoring of the PDCCH associated with the another component carrier with signaling between the user equipment and the network access node that transmits the another component carrier;
where the network access node, in response to the UE activating the monitoring of the PDCCH associated with the another component carrier for discontinuous reception and initiating a counter, and further in response to the UE terminating the monitoring of the PDCCH associated with the another component carrier for the discontinuous reception when a number of PDCCHs monitored reaches a maximum value, or is decremented to zero from an arbitrary initial value according to the counter, confirming that the user equipment has terminated the monitoring of the newly activated PDCCH associated with the another component carrier with signaling between the user equipment and the network access node that transmits the another component carrier.

13. The method of claim 12, where the network access node further assumes that the user equipment continues to monitor the control channel of the particular component carrier after the user equipment has activated the another component carrier.

14. The method of claim 12, where the network access node assumes, without expicity signaling the user equipment, that the user equipment has activated the use of the another component carrier and has begun to monitor the PDCCH of the another component carrier.

* * * * *